Figure 1:
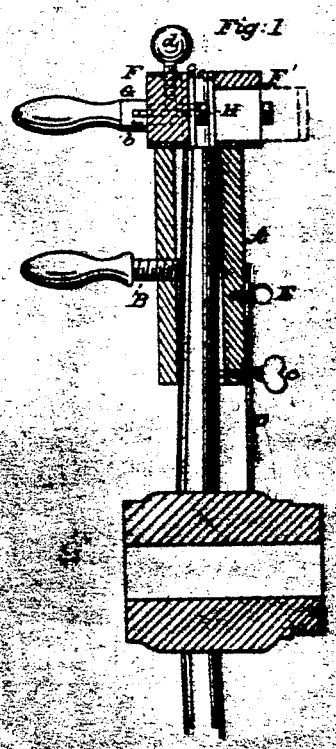
Figure 2:
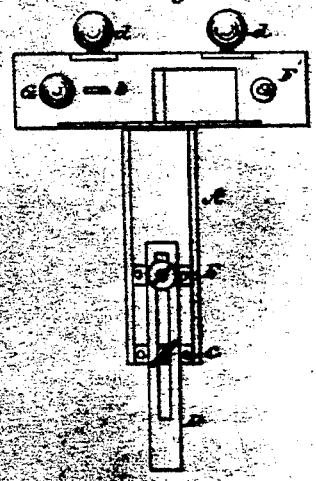
Figure 3:
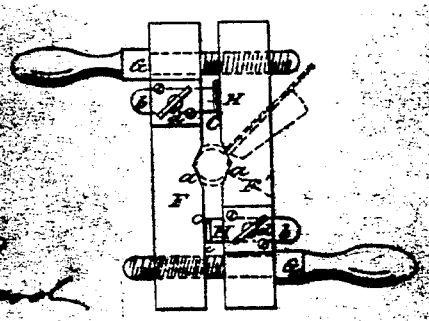

EXAMINER'S COPY

J. J. Croy,

Tenoning Spokes,

BEST AVAILABLE COPY

206 No. 221. A. I. Patented Mar. 1, 1859.

no Specification

Witnesses:

B. J. Whitely

James Tracy and

Inventor:

J. J. Croy

A.H. PHOTO-LITHO. CO. N.Y. (SEARLE'S PROCESS)